Aug. 13, 1935.  W. SYKES  2,011,349
HOMOPOLAR GENERATOR
Filed Aug. 23, 1930  3 Sheets-Sheet 1

Inventor.
Wilfred Sykes.
By Dyrenforth, Lee, Chritton and Wiles
Attys.

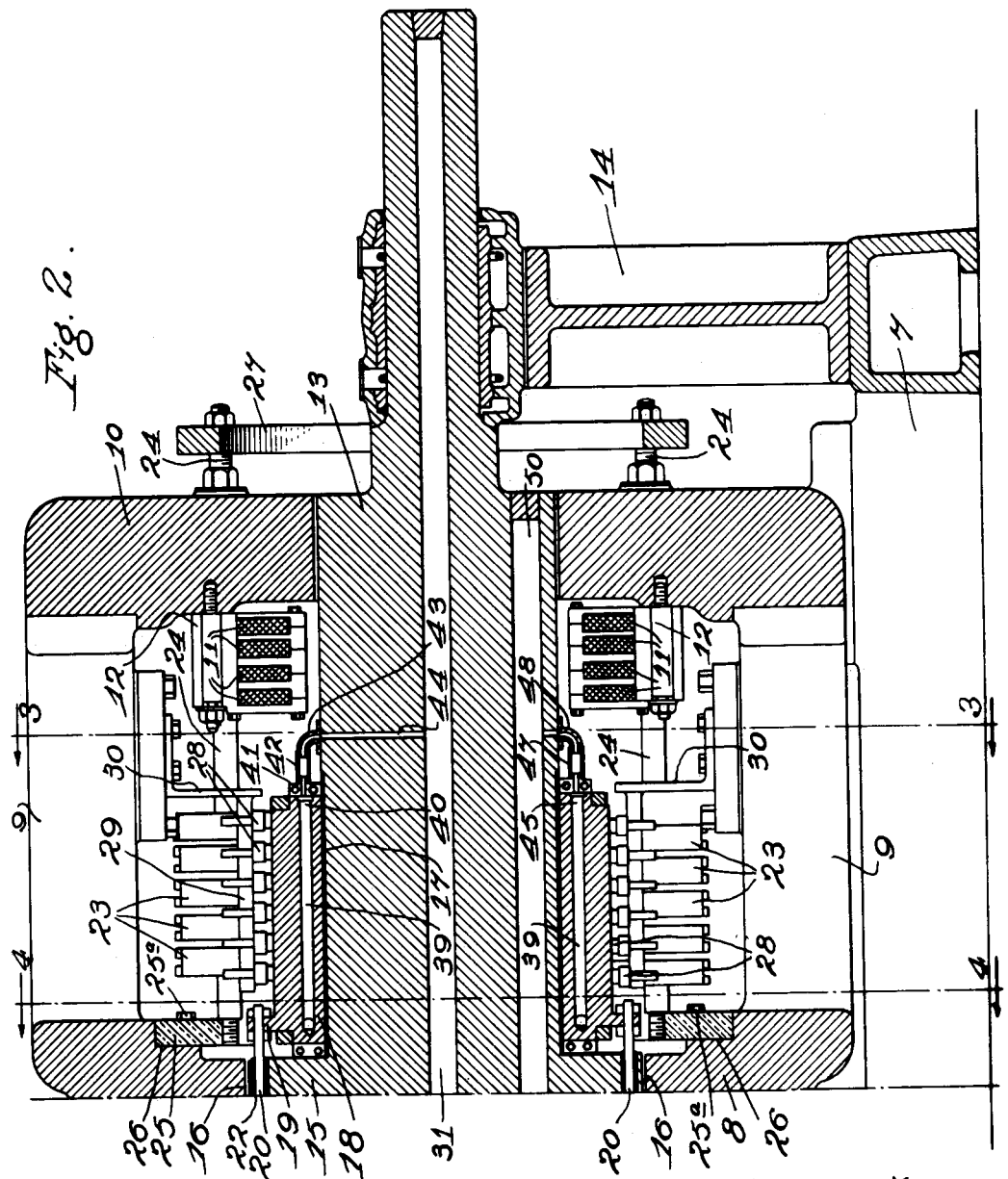

Aug. 13, 1935. W. SYKES 2,011,349
HOMOPOLAR GENERATOR
Filed Aug. 23, 1930 3 Sheets-Sheet 3
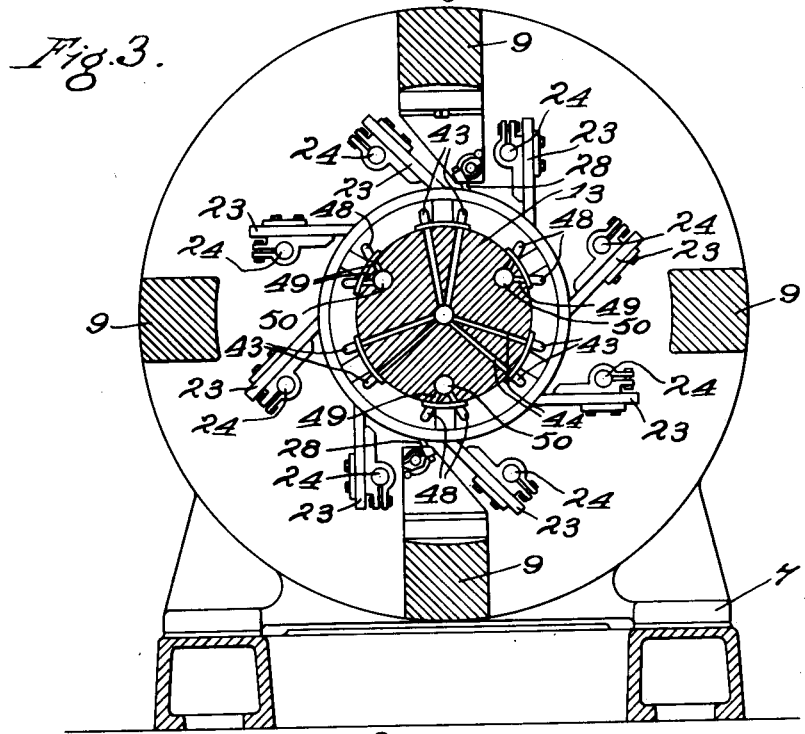
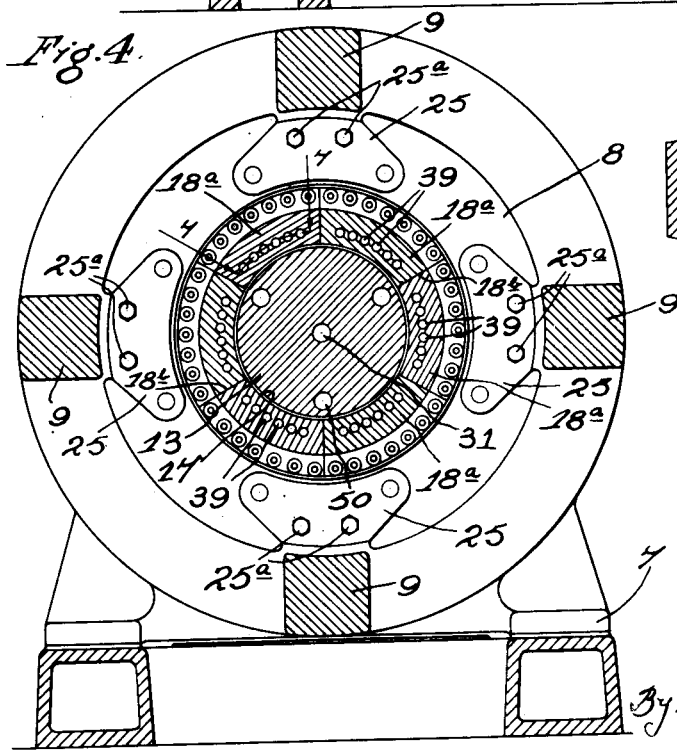
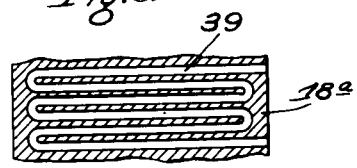

Patented Aug. 13, 1935

2,011,349

UNITED STATES PATENT OFFICE 2,011,349

HOMOPOLAR GENERATOR

Wilfred Sykes, Chicago, Ill., assignor to Inland Steel Company, Chicago, Ill., a corporation of Delaware Application August 23, 1930, Serial No. 477,408

11 Claims. (Cl. 171—212)

My invention relates to direct current generators of the homopolar type for the supplying of high amperage low voltage current more particularly for performing welding operations.

As a preface to the following description it may be stated that as homopolar direct generators have been hitherto constructed, it has not been possible to build a practical machine approximating the capacities required for welding especially in the producing of so-called light-wall pipe; namely, current production of the order of 150,000 to 200,000 amperes, or an approximate thereto, at a low potential of say 10 to 15 volts for welding large pipe, due to the high losses in the collector element of the generator and comprising those due to friction of the brushes and the contact between the brushes and the collector, producing heat of such a high degree that the brushes and collector burn, soon rendering the generator inoperative.

My primary object is to provide a construction of homopolar generator which shall be practical for the generating of such large amperage direct currents at a relatively low potential.

Still another object is to provide a construction of homopolar direct current generator which will react more quickly to changes in the field strength of the generator.

Referring to the accompanying drawings:

Figure 2 is a similar view of the other half of the generator.

Figure 3 is a view taken at the line 3—3 on Fig. 2 and viewed in the direction of the arrows.

Figure 4 is a section taken at the line 4—4 on Fig. 2 and viewed in the direction of the arrows; and Figure 5, a section taken at the line 5—5 on Fig. 4 and viewed in the direction of the arrows.

Figure 1:
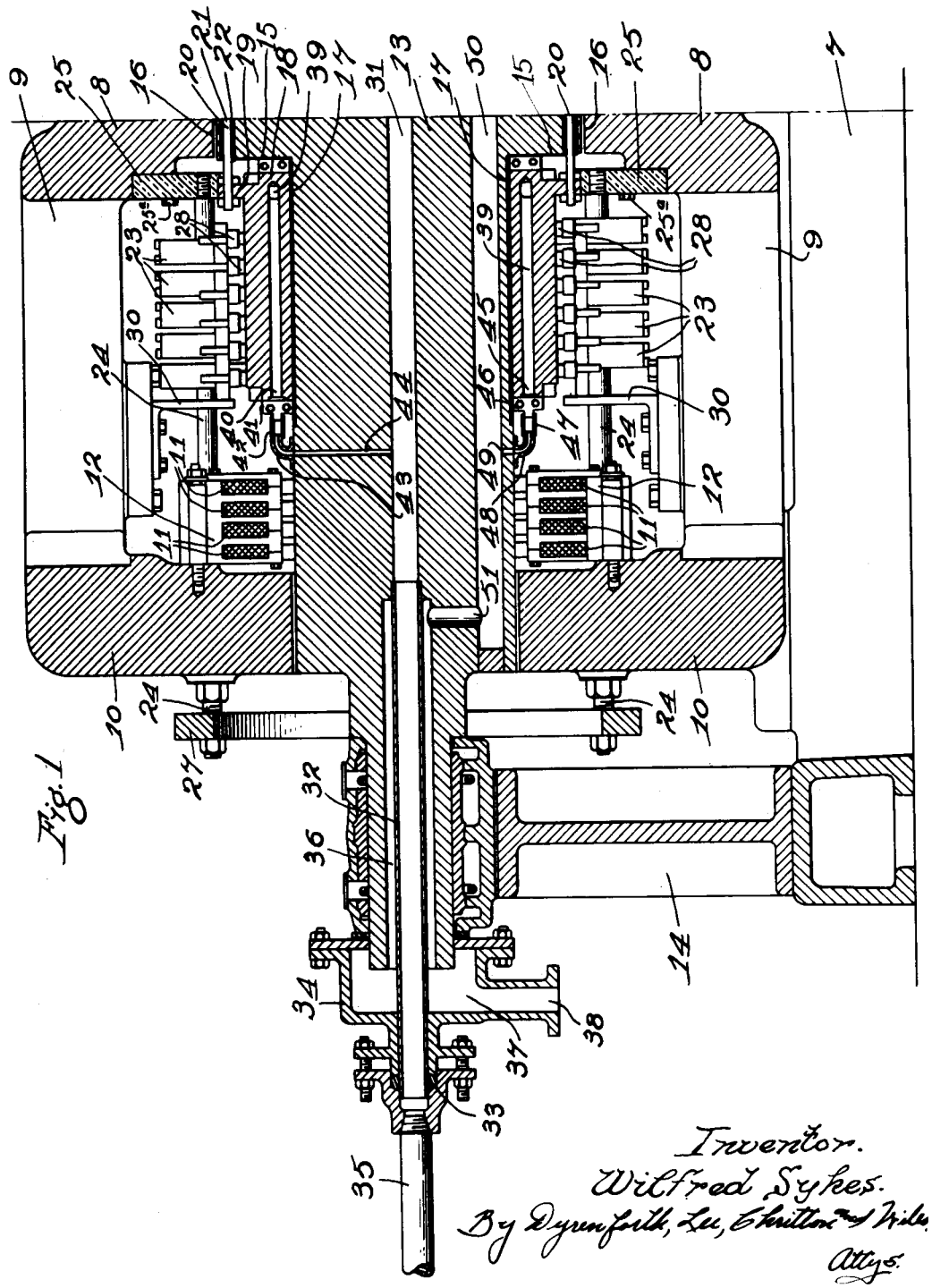
Figure 1 is a view in longitudinal sectional elevation of one-half of a homopolar direct current generator constructed in accordance with my invention.

Referring to the illustrated form of generator it comprises a casting 7 of magnetic material such as cast-steel having a ring member 8 rising crosswise therefrom midway between its ends and provided with a circular series of arms 9 which extend therefrom lengthwise of the casting in opposite directions and are connected at their outer ends with ring members 10 extending substantially parallel with the ring member 8, this construction forming a magnetic circuit for the conducting of the magnetic flux from the central part of a rotating core, hereinafter described, to its ends.

The generator also comprises field coils for providing excitation, these coils which are stationary being represented at 11 and shown as carried on suitable brackets 12 attached to the rings 10.

The rotating core of the machine which is represented at 13 and is formed of magnetic material and suitably journalled in uprights 14 rising from the ends of the casting 7, is provided midway between its ends with an annular flange portion 15 forming an annular enlargement positioned within the central opening 16 in the ring member 8, the opening 16 being of such a diameter as to provide running clearance to the rotating core 13.

Mounted on the core 13 at opposite sides of its annular enlargement 15 and insulated from the core, by the insulation represented at 17, are tubular current-collector members 18 as for example, and preferably, of copper, the adjacent ends of these collector members having annular flanges 19, and each collector member 18 being preferably formed of a plurality of segments 18ᵃ insulated from each other as represented at 18ᵇ. These collector members are electrically connected together by means of a circular series of copper rods 20 connected at their ends with the flanges 19 and extending through openings 21 in the enlargement 15 of the core 13 and insulated from the walls of the openings 21 by insulating sleeves represented at 22.

Cooperating with the collector members 18 are two sets of current-conducting brushes represented at 23, these sets of brushes being supported on two sets of rods 24 each surrounding the core 13 and shown as arranged in a circular series concentric with the axis of the core. The rods 24 are supported, at one end in brackets 25 of insulating material set into, and secured by screws 25ᵃ in recesses 26 in the faces of the ring member 8 and extend at their outer ends through openings in the end members 10 from the walls of which they are insulated, the outer ends of the rods 24 being connected with collector rings 27 located outside the magnetic field and concentrically surrounding the outer ends of the core 13 and spaced therefrom, these collector rings constituting the terminals of the generator.

In the construction shown supplemental, graphite brushes, represented at 28 are provided for contacting with the collector members 18, these brushes being shown as supported on the rod extensions 29 of brackets 30 secured to the arms 9.

Inasmuch as a generator, as described, in its operation for producing a current of great amperage and at a relatively low potential generates such a relatively high degree of heat that unless dissipated renders the machine impractical for continuous operation, I provide means for artificially internally cooling the collector members 18 thereby adding to the normal cooling effect produced by ordinary windage.

The means shown for this purpose comprise a conduit 31 extending centrally in the core 13, one end of this conduit being connected with a tube 32 journalled in the stuffing box portion 33 of a head 34 secured to one of the journal boxes in which the core 13 rotates, the stuffing box 33 being connected with a pipe 35 which would lead to any suitable source of supply of fluid, such as oil or water, or compressed air, if desired, in the case of small machines, the end of the core 13 containing the pipe 32 being recessed as represented at 36 to provide a chamber surrounding the pipe 32 out of communication with the conduit 31, the outer end of the chamber 36 opening into a chamber 37 in the head 34 provided with an outlet 38 through which the cooling fluid supplied to the collector members 18, as hereinafter described, discharges.

Each collector-member segment 18a contains a conduit 39 of coil-like form the inlet end 40 of which connects with a nipple 41 connected by a flexible rubber tube 42 with a pipe member 43, the members 43, one for each conduit coil 39, being disposed in a circular series about the core 13 and secured to the outer surface thereof and communicating, respectively, with cross passages 44 in the core and opening into the conduit 31. The outlet ends of the coil conduits 39 and represented at 45 are likewise connected with nipples 46 connected by rubber tubing 47 to pipe members 48 secured to the periphery of the core 13 and communicating with cross passages 49 in the core which open into passages 50 in the core which are closed at one end and open at their opposite end, through cross-passages 51, into the chamber 36.

It will thus be understood from the foregoing description that the cooling fluid supplied to the pipe 35 enters each conduit coil 39 through its inlet and thence discharges through its outlet to the exhaust passage 50 in the core 13 from which latter it passes to the outlet 38, the cooling fluid thus flowing through the collector members 18 serving to effectually and rapidly remove therefrom the heat generated in the operation of the machine, thereby preventing objectionable accumulation of the heat which results when the original good brush contact ceases.

The collector members 18 mounted on the core 13 as stated, are free to expand when they become heated by the operation of the machine, in a direction axially of the core thereby preventing any tendency to distortion of the members 18 and which if it did occur would objectionably affect the collection of the current.

The features of locating the collecting rings 27 outside of the main magnetic circuit and that of subdividing the collector members as described, are of advantage as the objectionable damping action of the relatively heavy copper conductors is greatly reduced and the field is caused to be quickly responsive to regulating means which may be provided.

It may be added that the parts of each collector member 18 are of the same polarity and of substantially the same potential, speaking in a general sense. Those skilled in the art will realize of course that there may be some drop in potential longitudinally in collector members of considerable length as well as local variations due to eddy currents or other causes.

While I have illustrated and described a particular construction of generator, I do not wish to be understood as intending to limit my invention thereto as various changes and alterations in structures shown may be made therein without departing from the spirit of my invention.

What I claim as new, and desire to secure by Letters Patent, is:

1. A direct current generator comprising a field member, a rotatable core, and a collector member, said core containing inlet and outlet conduits extending lengthwise thereof and said collector member containing a conduit communicating at opposite ends with said inlet and outlet conduits, respectively.

2. A direct current generator comprising a field member, a rotatable core and a collector member, said core containing inlet and outlet conduits extending lengthwise thereof and said collector member containing a plurality of conduits each communicating at its opposite ends with said inlet and outlet conduits, respectively.

3. A homopolar generator comprising a field member; a rotatable core; a metal collector member having a conduit for circulation of cooling liquid closed against the escape of liquid therefrom to the outer circumference of the collector member by the metal of said member; and means to provide such circulation.

4. A homopolar generator comprising a field member; a rotatable core; a collector member having a conduit for circulation of cooling liquid formed in and completely surrounded by integral material of the collector; and means to provide such circulation.

5. A homopolar generator comprising a field member; a rotatable core; a metal collector member having a conduit for circulation of cooling liquid formed in, and completely surrounded by, the metal of the collector member; and means to provide such circulation.

6. A homopolar generator comprising a field member; a rotatable core; an annular collector member having a conduit for circulation of cooling liquid formed in the material thereof and wholly confined between the inner and outer surface thereof; and means to provide such circulation.

7. A homopolar generator comprising a field member; a rotatable core; a collector member comprising an integral annular ring having a conduit for circulation of a cooling liquid formed in the material thereof and wholly confined between the inner and outer surfaces of the ring; and means to provide such circulation.

8. A homopolar generator comprising a field member; a rotatable core; a collector rotatable with the core; a plurality of brushes of like polarity and potentials contacting the surface of the collector; and means to prevent roughening of the collector and brushes by electrical contact losses comprising means to circulate cooling liquid within the body of said collector.

9. A homopolar generator comprising a field member, a rotatable core, a collector member all parts of which are of substantially the same potential, said core and collector member containing conduits for the circulation therethrough of a cooling liquid, and means for circulating cooling liquid through said conduits.

10. A homopolar generator comprising a field member, a rotatable core, and a collector member all parts of which are of substantially the same potential, said core and collector member containing communicating conduits for the circulation therethrough of a cooling fluid, said conduit in said collector being of general coil form.

11. A homopolar generator comprising a field member, a rotatable core and a collector member all parts of which are of substantially the same potential, said core containing inlet and outlet conduits extending lengthwise thereof and said collector member containing a plurality of conduits each communicating at its opposite ends with said inlet and outlet conduits, respectively said conduits in said collector member being of general coil form.

WILFRED SYKES.